United States Patent
Bae

(10) Patent No.: US 6,638,227 B2
(45) Date of Patent: Oct. 28, 2003

(54) ULTRASOUND IMAGING METHOD AND APPARATUS USING ORTHOGONAL GOLAY CODES

(75) Inventor: Moo Ho Bae, Seoul (KR)

(73) Assignee: Medison Co., LTD, Kangwon-do (*) Notice: Subject to any disclaimer, the term of this patent is extended or adjusted under 35 U.S.C. 154(b) by 0 days.

(21) Appl. No.: 10/133,144

(22) Filed: Apr. 25, 2002

(65) Prior Publication Data
US 2003/0018261 A1 Jan. 23, 2003

(30) Foreign Application Priority Data
Apr. 25, 2001 (KR) ........................................ 2001-22246

(51) Int. Cl.[7] ................................................ A61B 8/12
(52) U.S. Cl. ...................................................... 600/443
(58) Field of Search ................................ 600/455, 437, 600/443, 444, 447, 449; 73/625, 626; 367/1

(56) References Cited

U.S. PATENT DOCUMENTS 5,961,463 A * 10/1999 Rhyne et al. ............... 600/458
6,213,946 B1 * 4/2001 Brock-Fisher .............. 600/443
6,213,947 B1 * 4/2001 Phillips ...................... 600/443
6,312,384 B1 * 11/2001 Chiao ......................... 600/443
6,350,240 B1 * 2/2002 Song et al. .................. 600/443

* cited by examiner

Primary Examiner—Francis J. Jaworski
Assistant Examiner—Maulin M Patel
(74) Attorney, Agent, or Firm—Thelen Reid & Priest LLP; David B. Ritchie

(57) ABSTRACT

The present invention discloses an ultrasound imaging method and apparatus using a plurality of orthogonal Golay codes so that multi-transmission and reception is available and frame rate is not reduced. The ultrasound imaging method and apparatus uses an M number of Golay codes, wherein M is a positive number more than 2, the M number of Golay codes includes M number of code sequences, and the code sequences of the Golay codes are orthogonal to each other. Ultrasound pulse signals are transmit-focused to a focal point. The M×M number of Golay sequences are divided into M number of groups and then the divided Golay sequences are converted into ultrasound pulse signals. The transmit-focusing is then sequentially performed by the respective groups. Reflected signals from the focal point in response to the transmit-focusing is received by each group and receive-focuses. The received signals are pulse compressed and used to form a B-mode image.

12 Claims, 6 Drawing Sheets

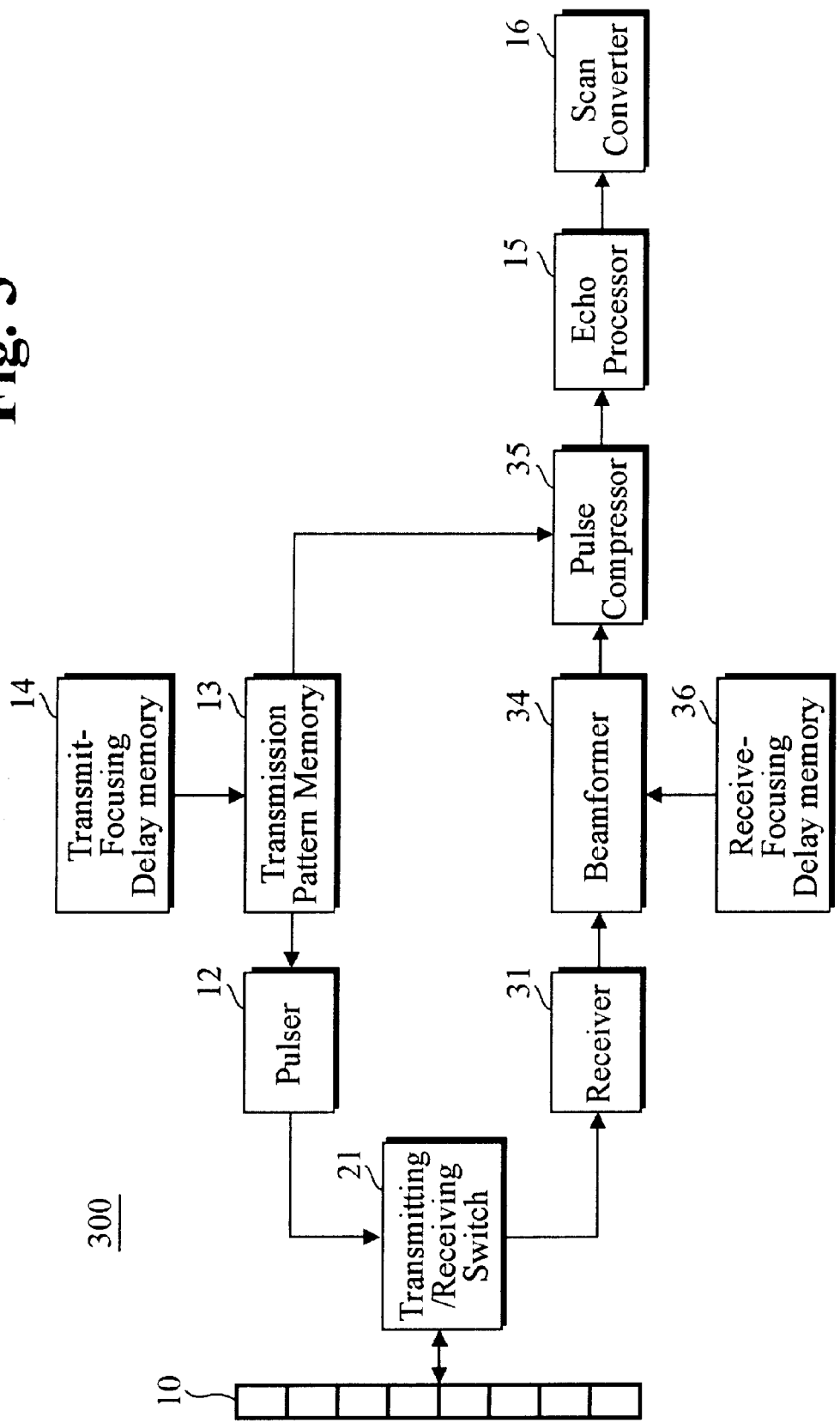

ULTRASOUND IMAGING METHOD AND APPARATUS USING ORTHOGONAL GOLAY CODES

FIELD OF THE INVENTION

The present invention relates to an ultrasound imaging apparatus and method thereof, more particularly, to an ultrasound imaging method and apparatus capable of multiple transmit/receive-focusing using a plurality of orthogonal Golay codes.

BACKGROUND OF THE INVENTION

The ultrasound imaging apparatus is widely used in the medical field for displaying an image of a target object, such as a human body. Ultrasound signals are transmitted to the target object, and are then reflected from the target object, thereby forming the ultrasound image.

In order to transmit the ultrasound signals, the ultrasound imaging apparatus generally includes a transducer array which includes a plurality of transducers and a pulser for driving each transducer. Each transducer generates ultrasound signals in response to the pulse applied from the pulser. During transmission of the ultrasound signal, a timing point of the ultrasound generation at each transducer is controlled, thereby transmit-focusing the ultrasound signals at a predetermined position within the target object. In other words, the pulser pulses the respective transducers with different time delays so that the ultrasound signals reach a desired position within the target object at the same time.

The ultrasound signals reflected from the target object are received by the transducer array. The time for the reflected signals to reach the respective transducers is different depending on the location of the transducers. Therefore, in order to compensate for the time difference among the transducers, a beamformer applies and adds the delayed time, with respect to the reflected signals, which are received by the respective transducers, and generates receive-focused signals.

The power of the received signals is remarkably lowered when the ultrasound signal is passing through a highly dense medium, such as the human body. As a result, when the target object is located deep in the body, the desired information is difficult to obtain in the above-mentioned ultrasound imaging apparatus. Most of the ultrasound imaging apparatuses currently being used generate ultrasound signals by applying a pulse of short duration to the transducers. Increasing the peak voltage of the pulse may solve the problems due to the attenuation of the ultrasound signals. However, there is a certain limitation to increasing the peak voltage of the pulse since this may affect the internal organs of the human body.

Instead of increasing the peak voltage of the pulse, the average power can be raised. As a result, the Signal to Noise Ratio (SNR) is remarkably improved. This method is called "pulse compression", and is used, for example, in radar equipment. An ultrasound imaging apparatus using pulse compression employs a coded long pulse instead of the conventional short pulse.

In conventional ultrasound diagnostic systems employing short pulses of high voltage, the resolution of an ultrasound image is determined by the impulse response characteristic of the transducers used in the ultrasound imaging apparatus. However, in an ultrasound imaging apparatus using the pulse compression, the resolution is determined by the convolution between the transducers and the coded long pulse. Such ultrasound imaging apparatuses include a pulse compressor based on a correlator at an ultrasound receiving part so that the same results may be obtained as if the short pulse were transmitted. Accordingly, the SNR can be raised effectively by using a predetermined voltage that is relatively lower than the peak voltage of the short pulse used in conventional ultrasound diagnostic systems.

The performance of the ultrasound imaging apparatus using the coded long pulse is highly influenced by the code characteristic. The image quality is determined by the relation between the frequency characteristic of the code used and the frequency characteristic of the ultrasound transducers. Furthermore, the system performance greatly depends upon how the correlator-based pulse compressor (provided at the receiving part) is implemented to obtain, with a coded long pulse transmission, the same result as if a short pulse was transmitted.

Some codes are biphase codes, consisting of 1 and −1 values only; some are arbitrary sequence codes, consisting of arbitrary values. One can easily construct the hardware for an ultrasound transmitter when using a biphase sequence code. Additionally, among the biphase codes, the Golay code has the characteristic that side-lobes in pulse-compressed output (as described above) are completely removed. There have been great endeavors to take advantage of this characteristic in ultrasound imaging apparatuses by using the coded long pulse.

FIG. 1 illustrates an ultrasound pulse transmission process in a conventional ultrasound imaging apparatus using Golay codes. For convenience of explanation, the drawing only exemplifies a Golay code including code sequence set ($A_1$, $A_2$) having length of L and M=2 and transmission to one focal point P.

In a first ultrasound transmission at one pulse repetition interval (PRI), all array elements 1a~1h within a predetermined aperture of transducer array 11 transmit ultrasound signals with increased amounts of delay to an object so that first code sequence $A_1$ has focal point P. Then, all array elements 1a~1h receive signals reflected from the object.

In a second ultrasound transmission at a next PRI, all array elements 1a~1h within the predetermined aperture of transducer array 11 transmit ultrasound signals with increased amounts of delay to an object so that second code sequence $A_2$ has focal point P. Then, all array elements 1a~1h receive signals reflected from the object.

An image of the scan line can be displayed by using the signals received from those two transmissions. The signals received from respective array elements 1a~1h are first pulse-compressed, and then the selected amount of delay loaded thereto. Alternatively, the pulse-compression of the signals can be performed after obtaining the results of loading the selected amount of delay.

When the ultrasound is transmit-focused to a focal point with the use of a conventional biphase Golay code as described so far, the transmission must be performed as many times as the number of sequences included in one Golay code, i.e. M number of transmissions. Consequently, the frame rate is reduced by 1/M compared to a general pulsing technique using the short pulse. In other words, since the conventional ultrasound imaging apparatus using a Golay code performs the transmission as many times as the number of sequences included in one Golay code, the ultrasound image is formed by using the reflected signals after performing the transmission, and thus remarkably reducing the frame rate.

SUMMARY OF THE INVENTION

It is, therefore, an objective of the present invention to provide an ultrasound imaging method and apparatus which is capable of multiple transmit/receive-focusing by using a plurality of mutually orthogonal Golay codes, resulting in a reduction in frame rate and improvement of the performance of the ultrasound imaging apparatus.

According to an aspect of the present invention, an ultrasound imaging method includes the steps of: (a) storing M number of Golay codes, wherein M is a positive number greater than two, the M number of Golay codes includes M number of code sequences, and the code sequences of the Golay codes are orthogonal to each other; (b) transmit-focusing ultrasound pulse signals to a transmitting focal point, wherein the transmit-focusing is sequentially performed by the M number of groups of the Golay code sequences converted into the ultrasound pulse signals; (c) receiving signals reflected from the transmitting focal point in response to the transmit-focusing with respect to each of M number of groups; (d) receive-focusing the received reflected signals; (e) performing pulse compression with respect to the receive-focused signals; and (f) forming a B-mode image by processing the pulse-compressed signals.

According to another aspect of the present invention, an ultrasound imaging method includes the steps of: (a) storing an M number of Golay codes, wherein M is a positive number greater than two, the M number of Golay codes includes M number of code sequences, and the code sequences of the Golay codes are orthogonal to each other; (b) transmit-focusing ultrasound pulse signals to a transmitting focal point, wherein the transmit-focusing is sequentially performed by the M number of groups of the Golay code sequences converted into the ultrasound pulse signals; (c) receiving signals reflected from the transmitting focal point in response to the transmit-focusing with respect to each of the M number of groups; (d) performing pulse compression with respect to the received signals, wherein the pulse compression is performed once with respect to each stored Golay code; (e) receive-focusing the pulse-compressed signals; and (f) forming a B-mode image by processing the receive-focused signals.

According to still further aspect of the present invention, an ultrasound imaging apparatus includes: (a) means for storing M number of Golay codes, wherein M is a positive number greater than two, the M number of Golay codes includes M number of code sequences, and the code sequences of the Golay codes are orthogonal to each other; (b) a plurality of transducers for transmit-focusing ultrasound pulse signals to a selected transmitting focal point, wherein the transmit-focusing is sequentially performed by the M number of groups of the Golay code sequences converted into the ultrasound pulse signals, and the transducers receive reflected signals from the transmitting focal points in response to the transmit-focusing with respect to each group; (c) means for receive-focusing the received reflected signals; (d) means for performing pulse compression with respect to the receive-focused signals, wherein the pulse compression is performed once with respect to each stored Golay code; and (e) means for forming a B-mode image by processing the pulse-compressed signals.

According to yet another aspect of the present invention, an ultrasound imaging apparatus includes: (a) means for storing M number of Golay codes, wherein M is a positive number greater than two, the M number of Golay codes includes M number of code sequences, and the code sequences of the Golay codes are orthogonal to each other; (b) a plurality of transducers for transmit-focusing ultrasound pulse signals to a transmitting focal point, wherein the transmit-focusing is sequentially performed by the M number of groups of the Golay code sequences converted into the ultrasound pulse signals, and the transducers receive reflected signals from the transmitting focal points in response to the transmit-focusing with respect to each group; (c) means for performing pulse compression with respect to the received signals, wherein the pulse compression is performed once with respect to each stored Golay code; (d) means for receive-focusing the pulse-compressed signals; and (e) means for forming a B-mode image by processing the receive-focused signals.

BRIEF DESCRIPTION OF DRAWINGS

The above and other objects and features of the present invention will become apparent from the following description of the preferred embodiments given in conjunction with the accompanying drawings.

FIG. 3 is a block diagram of an ultrasound imaging apparatus using the pulse compression method in accordance with the present invention.

DETAILED DESCRIPTION OF THE PRESENT INVENTION

Preferred embodiments of the present invention will now be described with references to the accompanying drawings.

During ultrasound transmission, an ultrasound imaging apparatus of the present invention uses the Golay code, a coded long pulse instead of the short pulse. The ultrasound imaging apparatus can increase frame rate by transmitting a plurality of mutually orthogonal Golay codes at the same time.

The Golay code consists of a set of complementary biphase sequences. A predetermined biphase sequence set having an M number of sequences with a length of L can be represented as follows:

$$A_i = [\alpha_{i1}, \alpha_{i2}, \ldots, \alpha_{iL}] \qquad \text{Eq. (1)}$$

wherein i=1, 2, . . . , M

When sequence sets satisfy the following equation:

$$\sum_{i=1}^{M} \sum_{l=1}^{L-k} a_{il} a^*_{i,l+k} = ML\delta(k), \quad k = 0, 1, \ldots, L-1 \qquad \text{Eq. (2)}$$

they are complementary biphase sequence sets and may be used as a Golay code.

$\delta(k)$ in Equation (2) represents a general dirac function. If k=0, then $\delta(k)$ is 1 and; if k≠0, then $\delta(k)$ is 0.

There are an M number of code sequence sets satisfying the following equation:

$$x(k) = \sum_{i=1}^{M}\sum_{l=1}^{L-k} a_{il}b^*_{i,l+k} = 0, \quad k = 0, 1, \ldots, L-1 \qquad \text{Eq. (3)}$$

such that complementary code sequences (as defined in Eq. (2)) are mutually orthogonal to each other. In other words, for complementary code sequences $(A_1, A_2)$ as defined in Equation (2), there exist complementary code sequences $(B_1, B_2)$ that are orthogonal to code sequences $(A_1, A_2)$.

Equation (4) represents a Golay code for M=2 and L=32.

$A_1$=[1,-1,-1,-1,1,1,-1,1,1,-1,-1,-1,-1,1,1,-1,1,-1,-1,-1,1,1,-1, 1,-1,1,1,1,1,1,-1,1]

$A_2$=[1,-1,-1,-1,1,1,-1,1,1,-1,-1,-1,-1,1,1,-1,1,-1,1,1,1,-1,-1,1,- 1,1,-1,-1,-1,-1,1,-1]     Eq. (4)

Sequence sets orthogonal to the sequence sets in the Equation (4) are:

$B_1$=[1,-1,1,1,1,1,1,-1,1,-1,1,1,1,-1,-1,1,1,1,-1,1,1,1,1,1,1,-1,-1,1,- 1,-1,1,1,1,-1]

$B_2$=[1,-1,1,1,1,1,1,-1,1,-1,1,1,1,-1,-1,1,1,-1,1,-1,1,-1,-1,-1,-1,1,1, 1,-1,1,1,-1,-1,1,1]     Eq. (5)

According to Equation (2), when the two codes $(A_1, A_2)$ and $(B_1, B_2)$ take an autocorrelation function, they have the same main lobe and side lobes of opposite polarity. Accordingly, if two autocorrelation functions are added, the main lobe increases two-fold and the side lobes offset each other.

Referring to Equation (3), since $x(k)$ of the respective code sequences $(A_1, A_2)$ of the Equation (4) and the corresponding code sequences $(B_1, B_2)$ of the Equation (5) is 0, the respective code sequences are orthogonal to each other.

Figure 1:
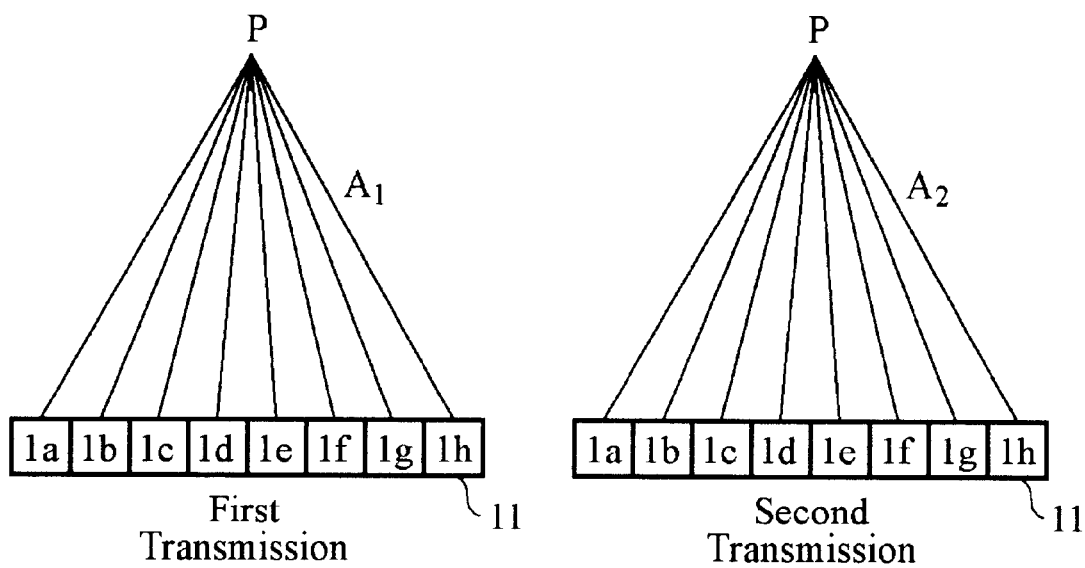
FIG. 1 illustrates an ultrasound pulse transmission in a conventional ultrasound imaging apparatus using Golay codes.
Figure 2A:
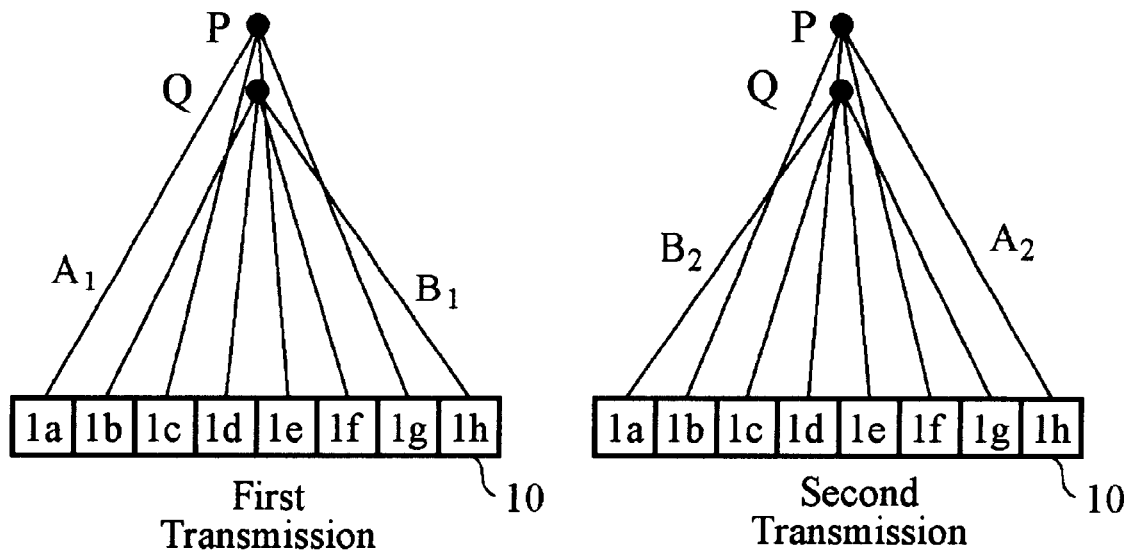
FIGS. 2A and 2B illustrate an ultrasound pulse transmission in an ultrasound imaging apparatus using Golay codes in accordance with the present invention.
Figure 2B:
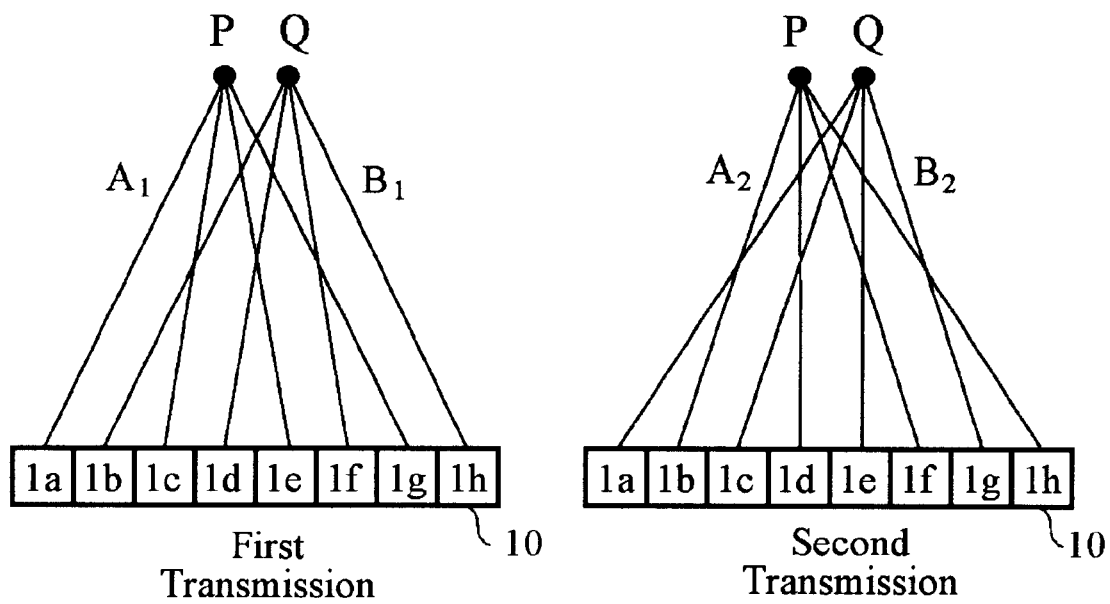

FIGS. 2A and 2B illustrate the ultrasound pulse transmission in an ultrasound imaging apparatus using Golay codes in accordance with the present invention. Referring to FIGS. 2A and 2B, the transmission code patterns involve a first Golay code having mutually complementary biphase code sequences $(A_1, A_2)$ and a second Golay code having biphase code sequences $(B_1, B_2)$ orthogonal to first Golay code sequences $(A_1, A_2)$.

FIG. 2A illustrates ultrasound transmissions focused on two points P and Q, which are on the same scan line. FIG. 2B illustrates ultrasound transmissions focused on two points P and Q, which are on different scan lines.

In the first instance of ultrasound transmission, odd transducers 1a,1c,1e and 1g of transducer array 10 transmit-focus ultrasound pulse signals corresponding to first code sequence $A_1$ of the first Golay code at focal point P. Even transducers 1b,1d,1f and 1h of transducer array 10 transmit-focus ultrasound pulse signals corresponding to the first code sequence $B_1$ of the second Golay code at the focal point Q. Transmission of ultrasound pulse signals to a target object, such as a human body, and reception of reflected signals from the target object occur simultaneously.

In the second instance of ultrasound transmission, even transducers 1b,1d,1f and 1h of transducer array 10 transmit-focus ultrasound pulse signals corresponding to second code sequence $A_2$ of the first Golay code at focal point P. Odd transducers 1a,1c,1e and 1g transmit-focus ultrasound pulse signals corresponding to the second code sequence $B_2$ of second Golay code at focal point Q. Transmission of ultrasound pulse signals to the target object and reception of reflected signals from the target object occur simultaneously.

Switching between even transducers 1b,1d,1f and 1h and odd transducers 1a,1c,1e and 1g of transducer array 10 with respect to corresponding Golay codes in the first and second ultrasound transmissions reduces the grating lobes. The grating lobe is the peak of a beam pattern generated when the ultrasound signals is supplemented in an unwanted way.

If focusing is generally performed by skipping every other transducer, the interval between transducers becomes greater with respect to the width of transducer array 10, causing more severe grating lobes.

Accordingly, switching transducers in the first and second instances of ultrasound transmission effectively reduces the production of grating lobes (as if all of transducers transmitted ultrasound signals).

An ultrasound imaging apparatus of the present invention will now be described in detail with reference to the accompanying drawings.

FIG. 3 depicts a block diagram of the present invention showing an ultrasound imaging apparatus of the pulse compression type.

Referring to FIG. 3, an ultrasound imaging apparatus 300 includes transducer array 10; pulser 12; transmission pattern memory 13; transmit-focusing delay memory 14; transmitting/receiving switch 21; receiver 31; beamformer 34; pulse compressor 35; receive-focusing delay memory 36; echo processor 15; and scan converter 16.

Transducer array 10 includes a plurality of transducers for generating ultrasound pulse signals and transmitting to a target object (not shown). Transmit-focusing delay memory 14 stores a delay pattern of the ultrasound pulse signals in order to compensate for the time taken by the ultrasound pulse signal to reach the object, since the time varies with the location of each transducer. Transmission pattern memory 13 stores transmission signal patterns corresponding to sequences of the Golay code. For example, referring back to FIGS. 2A and 2B, transmission pattern memory 13 stores transmission signal patterns corresponding to sequences $(A_1, A_2)$ of the first Golay code and transmission signal patterns corresponding to sequences $(B_1, B_2)$ of the second Golay code. For first ultrasound transmission, transmission pattern memory 13 appropriately delays and transmits to pulser 12 a signal transmission pattern corresponding to $A_1$ and $B_1$ for odd transducers 1a,1c,1e and 1g of transducer array 10 in accordance with a pre-stored delay pattern in transmit-focusing delay memory 14. For the second ultrasound transmission, transmission pattern memory 13 appropriately delays and transmits to pulser 12 a signal transmission pattern corresponding to $A_1$ and $B_1$ for even transducers 1b,1d,1f and 1h of transducer array 10 in accordance with a pre-stored delay pattern in transmit-focusing delay memory 14. Instead of transmit-focusing delay memory 14 and transmission pattern memory 13, other device circuits or software programs may be used to provide the delayed transmission signal patterns.

Pulser 12 is a bipolar pulser, which receives the delayed transmission signal patterns from transmission pattern memory 13 and amplifies them with a bipolar pulse having a predetermined voltage level for application to transducer array 10 through transmitting/receiving switch 21. Transducer array 10 generates ultrasound pulse signal in response to the voltage level of the bipolar pulse applied from pulser 12 and transmits them to a target object (not shown). Referring back to FIGS. 2A and 2B, transducer array 10 transmits ultrasound signals by switching the locations of the transducers that correspond to Golay codes in first and second instances of ultrasound transmission.

After transmitting the ultrasound signals, transducer array 10 receives reflected signals (not shown) from the object and applies them to receiver 31 through transmitting/receiving switch 21. Switch 21 acts as a duplexer, which protects receiver 31 from possible high voltage power being released from pulser 12. That is, switch 21 properly switches pulser 12 and receiver 31 when transducer array 10 performs an ultrasound transmission and reception respectively.

Receiver 31 amplifies the reflected signals, which are RF (radio frequency) signals applied from transducer array 10 through switch 21, and converts them to digital signals. Receiver 31 may include, for example, a pre-amplifier, a Time Gain Compensation (TGC) unit for compensating attenuation, and an Analog-to-Digital Converter ADC.

Receive-focusing delay memory 36 stores a delay value, which varies with the location of each transducer in array 10 and is applied to a signal reflected from the object. Here, the reflected signal is received by each transducer in order to compensate for the time taken by the signal to return from the object. Beamformer 34 performs a receive-focusing: receives a digital signal from receiver 31; obtains the delay value from receive-focusing delay memory 36; delays and adds the reflected signal from the respective transducer. If one uses the ultrasound transmission method as shown in FIG. 2A, beamformer 34 may be implemented with a single beamforming device. If one uses the method shown in FIG. 2B, two beamforming devices may be used.

In an ultrasound imaging apparatus using a long code such as a Golay code, the signal received by receiver 31 has a large side-lobe, too large to form an image. Accordingly, pulse compression of the large side-lobe is necessary in order to obtain a resolution similar in quality to that of an apparatus using a short pulse. Pulse compressor 35 performs the pulse compression with respect to the receive-focused signal from beamformer 34. The pulse-compressed signal is applied to echo processor 15 and scan converter 16.

Echo processor 15 changes the pulse-compressed signals of pulse compressor 155 into baseband signals, extracts an envelope, by using a quadrature demodulator, and thereby obtains data of a scan line.

Scan converter 16 stores the data obtained from echo processor 15 in a memory (not shown), and matches the scan direction of the stored data to the pixel direction of a monitor (not shown). The data is mapped out at the corresponding pixel position on a monitor.

Figure 4:
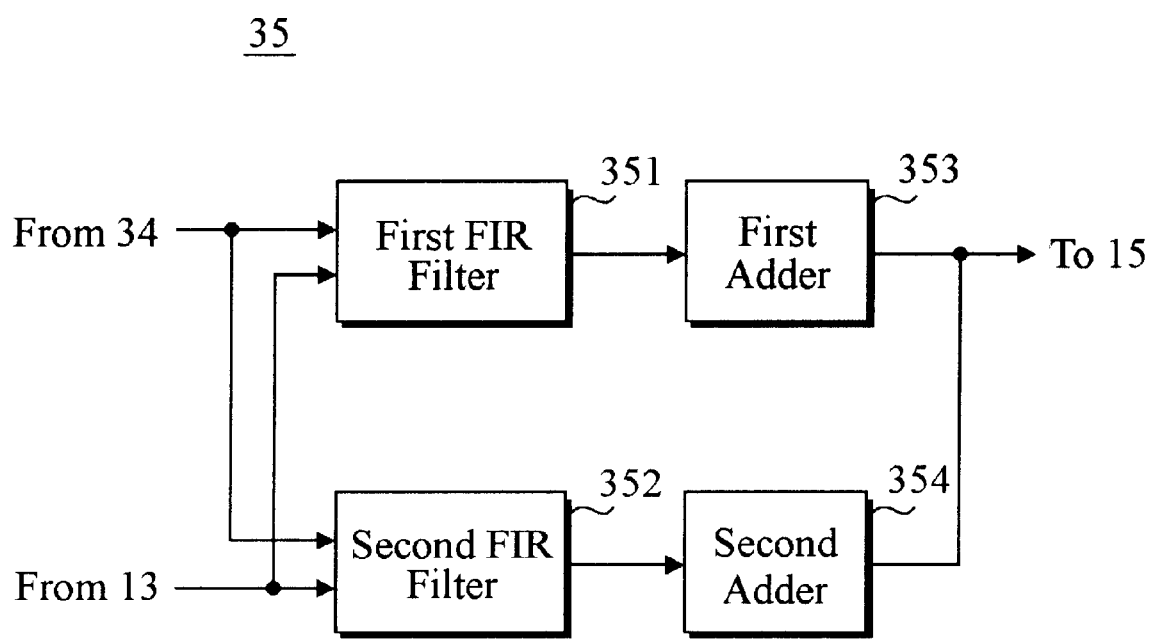
FIG. 4 is a detailed block diagram of the pulse compressor shown in FIG. 3.

FIG. 4 depicts a detailed block diagram of pulse compressor 35 shown in FIG. 3.

Referring now to FIG. 4, pulse compressor 35 includes first FIR filter 351 and first adder 353, both for performing pulse compression using the first Golay code; and second FIR filter 352 and second adder 354, both for performing pulse compression using the second Golay code.

The signal, which is receive-focused at beamformer 34, is simultaneously applied to first and second FIR filters 351 and 352. First FIR filter 351 and first adder 353 perform the pulse compression with respect to receive-focused signal by using the first Golay code. That is, by using the first code sequence of first Golay code, which is inputted from transmission pattern memory 13, as a filter coefficient, first FIR filter 351 filters a signal that is received after the first transmission and is receive-focused, and then stores it in first adder 353. Using the second code sequence of the first Golay code, which is inputted from transmission pattern memory 13, as a filter coefficient, first FIR filter 351 filters a signal that is received after the second transmission and is receive-focused, and then stores it in first adder 353. Corresponding sequences of the first and second Golay code are orthogonal to each other. Therefore, the signal relative to the second Golay code's sequences is removed at first FIR filter 351.

First adder 353 adds the filtered signal received from first FIR filter 351 and inputs it to echo processor 15.

Similarly, second FIR filter 352 and second adder 354 perform a pulse compression with respect to the receive-focused signal by using the second Golay code. Using the first code sequence of the second Golay code, which is inputted from the transmission pattern memory 13, as a filter coefficient, second FIR filter 352 filters a signal that is received after the first transmission and receive-focused, and then stores it in second adder 354. Using the second code sequence of the second Golay code, which is inputted from transmission pattern memory 13, as a filter coefficient, second FIR filter 352 filters a signal that is received after the second transmission and receive-focused, and then stores it in second adder 354. During this filtering process by second FIR filter 352, the signal relative to the second Golay code's sequences is removed at second FIR filter 352, because corresponding sequences of the first Golay code and second Golay code are orthogonal to each other. Second adder 354 adds the filtered signals received from the second FIR filter 352 and inputs them to echo processor 15.

If the transmit-focusing is performed with respect to two focal points on two different scan lines as shown in FIG. 2B, ultrasound imaging apparatus 100 may include two beamformers (not shown) in order to perform receive-transmission. Pulse compressor 35 includes the same elements as shown in FIG. 4 that were used for transmit-focusing at two focal points on the same scan line.

In other words, the configuration and operation are similar to those in FIG. 4, except that two beamformers perform the pulse compression with respect to two receive-focused signals. Accordingly, the pulse compression process in which signals are applied from two beamformers to first and second FIR filters 351 and 352 of pulse compressor 35 is also similar.

Figure 5:
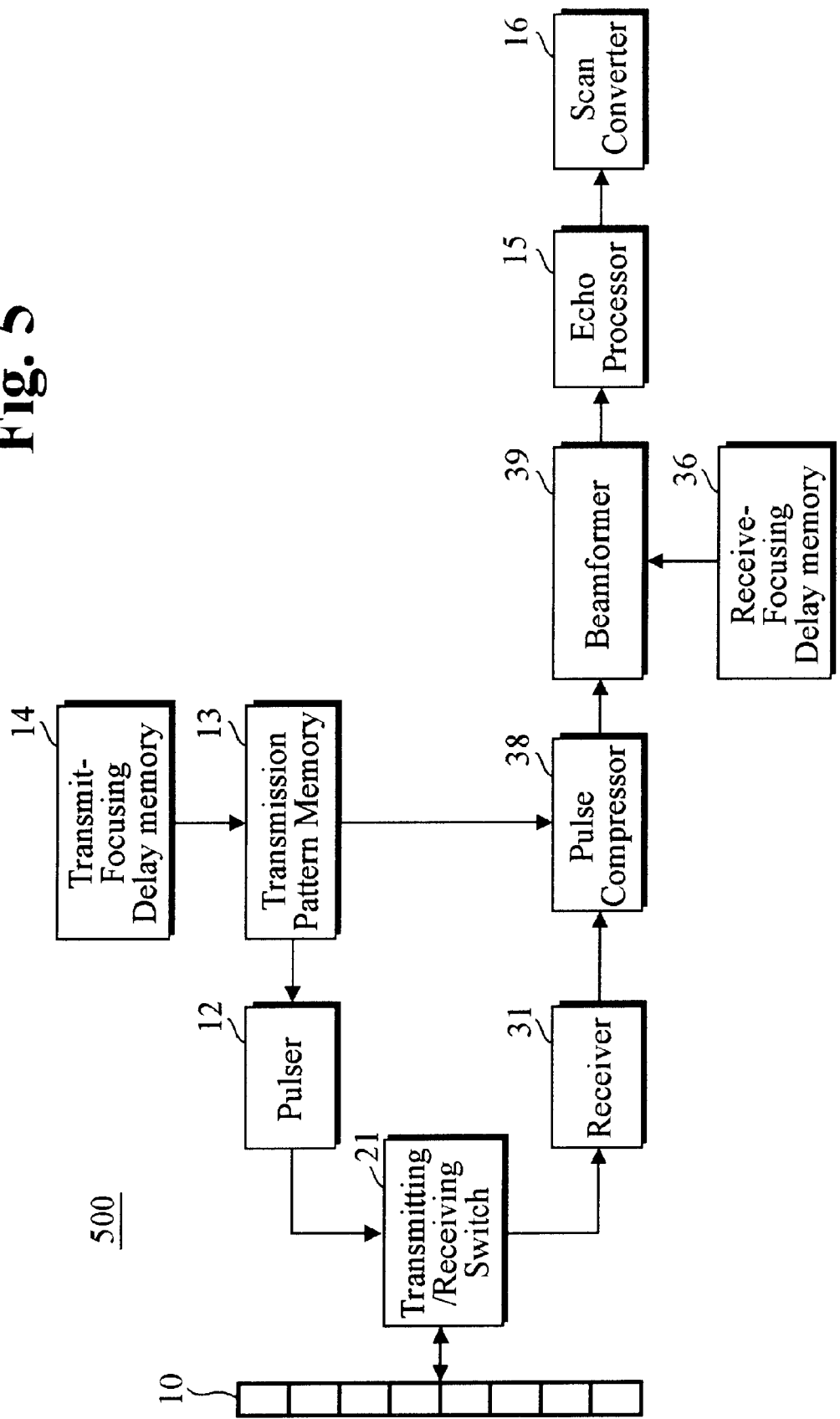
FIG. 5 is a block diagram of another ultrasound imaging apparatus using the pulse compression method in accordance with the present invention.

FIG. 5 depicts a block diagram of the present invention showing another ultrasound imaging apparatus using pulse compression method.

Referring now to FIG. 5, pulse compressor 38 of ultrasound imaging apparatus 500 performs pulse-compression with respect to RF signals from receiver 31. Beamformer 39 performs receive-focusing with respect to the pulse-compressed signals and applies them to echo processor 15. If the pulse compression is performed prior to the receive-focusing, as shown in FIG. 5, the side-lobe is removed and expansion of the width of the main-lobe may be prevented. The side-lobe is generated along the direction of the ultrasound proceeding within the near field when the pulse-compression is performed after the receive-focusing.

Ultrasound imaging apparatus 500 has a similar configuration to the ultrasound imaging apparatus 100 of FIG. 3, except that pulse compressor 38 is disposed prior to beamformer 39. Therefore, detailed descriptions of the other elements of apparatus 500 will be omitted.

Figure 6:
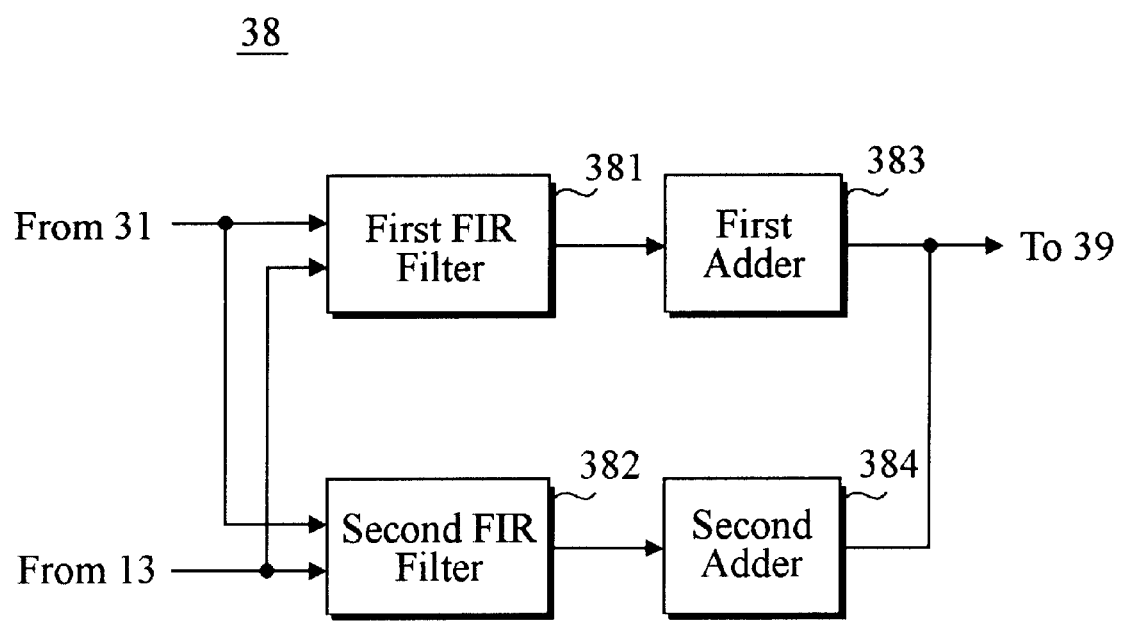
FIG. 6 is a detailed block diagram of the pulse compressor shown in FIG. 5.

FIG. 6 is a detailed block diagram of pulse compressor 38 shown in FIG. 5. Referring now to FIG. 6, pulse compressor 38 of ultrasound imaging apparatus 500 includes first FIR filter 381, second FIR filter 382, first buffer adder 383 and second buffer adder 384. Beamformer 39 will be explained in terms of two beamforming elements (though not shown).

Reflected signals being transmitted and received in accordance with the first and second transmissions, as in FIG. 2A or 2B, are applied to first and second FIR filters 381 and 382 of pulse compressor 38 through receiver 31.

First and second FIR filters 381 and 382 filter the reflected signal after first transmission by using the first code sequence of the first Golay code and the first code sequence of the second Golay code as a filter coefficient. First and second FIR filters 381 and 382 then apply the filtered signals to first and second adders 383 and 384, respectively. The first code sequences of the first and second Golay codes are received from transmission pattern memory 13, and the reflected signals are received from receiver 31.

First and second FIR filters 381 and 382 then filter the reflected signal after the second transmission by using the second code sequence of the first Golay code and the second code sequence of the second Golay code as a filter coefficient. First and second FIR filters 381 and 382 then apply the filtered signals to first and second adders 383 and 384, respectively. The second code sequences of the first and second Golay codes are received from transmission pattern memory 13, and the reflected signals are received from receiver 31.

First and second adders 383 and 384 add a filtered result value after the first transmission and another filtered result value after the second transmission, and input the resultant values to the two beamforming elements (not shown) included in beamformer 39.

First and second beamforming elements of beamformer 39 receive-focus pulse-compressed signals applied from first and second adders 383 and 384 by referring to delay values from receive-focusing delay memory 36, and apply the respective receive-focused signals to echo processor 15.

Although a one-dimensional transducer array has been described in the present invention for the sake of brevity, those skilled in the art will recognize that the present invention is not limited to one-dimensional arrays.

For instance, two-dimensional transducer arrays, in which small-sized transducers are disposed on a two-dimensional plane or a curved surface for free steering of ultrasound signals in a lateral and elevation direction, may be utilized. If two-dimensional transducer arrays are employed in accordance with the present invention, they may transmit ultrasound in various groups, e.g., randomly divided into M number of groups or M number of groups including transducers within a like range of a concentric circle or a polygon.

Further, the present invention is also applicable to 1.75-dimensional transducer arrays that have larger but less number of transducers than those in a two-dimensional array. These arrays are capable of focusing in the elevation direction, however have limitations in steering.

Further, the present invention is also applicable to 1.5-dimensional transducer arrays that are capable of focusing in the elevation direction since transducers of symmetrical counterparts in the elevation direction are electrically connected to each other; however, steering is impossible.

Additionally, although the present invention has been described with reference to a Golay code of M=2, the present invention is not limited to M=2.

If M>2, then there are an M number of transmission focal points at each instance of ultrasound transmission. Instead of the alternate transmission of odd/even transducers, as shown in FIGS. 2A–2B, all transducers transmit to one focal point by switching locations of the respective transducers transmitting sequences of each Golay code at each instance of transmission.

The ultrasound imaging method and apparatus disclosed herein is capable of multiple transmit/receive-focusing by using a plurality of mutually orthogonal Golay codes, reduces a frame rate, and thereby improving the performance of the ultrasound imaging apparatus.

While the present invention has been shown and described with respect to the particular embodiments, it will be apparent to those skilled in the art that many exchanges and modifications may be made without departing from the spirit and scope of the invention as defined in the appended claims.

What is claimed is:

1. An ultrasound imaging method comprising the steps of:
   (a) storing M number of Golay codes, wherein M is a positive number greater than two, the M number of Golay codes includes M number of code sequences, and the code sequences of the Golay codes are orthogonal to each other;
   (b) transmit-focusing ultrasound pulse signals to a transmitting focal point, wherein the transmit-focusing is sequentially performed by the M number of groups of the Golay code sequences converted into the ultrasound pulse signals;
   (c) receiving signals reflected from the transmitting focal point in response to the transmit-focusing with respect to each of M number of groups;
   (d) receive-focusing the received reflected signals;
   (e) performing pulse compression with respect to the receive-focused signals; and
   (f) forming a B-mode image by processing the pulse-compressed signals.

2. The ultrasound imaging method of claim 1, wherein the pulse compression further comprises the steps of:
   repeatedly extracting the receive-focused signals corresponding to the transmit-focusing with respect to a (k)th group among the M number of groups until k=1–M; and
   adding the extracted signals.

3. The ultrasound imaging method of claim 2, wherein the extracting step further comprises the step of:
   repeatedly filtering, by using a (k)th code sequence of the Golay code as a filter coefficient, the receive-focused signals corresponding to the transmit-focusing with respect to the (k)th group among the M number of groups until k=1–M.

4. An ultrasound imaging method comprising the steps of:
   (a) storing an M number of Golay codes, wherein M is a positive number greater than two, the M number of Golay codes include M number of code sequences, and the code sequences of the Golay codes are orthogonal to each other;
   (b) transmit-focusing ultrasound pulse signals to a transmitting focal point, wherein the transmit-focusing is sequentially performed by the M number of groups of the Golay code sequences converted into the ultrasound pulse signals;
   (c) receiving signals reflected from the transmitting focal point in response to the transmit-focusing with respect to each of the M number of groups;
   (d) performing pulse compression with respect to the received signals, wherein the pulse compression is performed once with respect to each stored Golay code;
   (e) receive-focusing the pulse-compressed signals; and
   (f) forming a B-mode image by processing the receive-focused signals.

5. The ultrasound imaging method of claim 4, wherein the pulse compression further comprises the steps of:
   repeatedly extracting the received signals corresponding to the transmit-focusing with respect to a (k)th group among the M number of groups from the received signals until k=1–M; and
   adding the extracted signals.

6. The ultrasound imaging method of claim 5, wherein the extracting step further comprises the step of:
   repeatedly filtering, by using a (k)th code sequence of the Golay code as a filter coefficient, the receiving signals corresponding to the transmit-focusing with respect to the (k)th group among the M number of groups until k=1–M.

7. An ultrasound imaging apparatus comprising:

(a) means for storing M number of Golay codes, wherein M is a positive number greater than two, the M number of Golay codes includes M number of code sequences, and the code sequences of the Golay codes are orthogonal to each other;

(b) a plurality of transducers for transmit-focusing ultrasound pulse signals to a transmitting focal point, wherein the the transmit-focusing is sequentially performed by the M number of groups of the Golay code sequences converted into the ultrasound pulse signals and the transducers receive reflected signals from the transmitting focal points in response to the transmit-focusing with respect to each group;

(c) means for receive-focusing the received reflected signals;

(d) means for performing pulse compression with respect to the receive-focused signals, wherein the pulse compression is performed once with respect to each stored Golay code; and (e) means for forming a B-mode image by processing the pulse-compressed signals.

8. The ultrasound imaging apparatus of claim 7, wherein the means for performing pulse compression further comprises:

means for repeatedly extracting the receive-focused signals corresponding to the transmit-focusing with respect to a (k)th group among the M number of groups until k=1–M; and means for adding the extracted signals.

9. The ultrasound imaging apparatus of claim 8, wherein the means for repeatedly extracting further comprises:

means for repeatedly filtering, by using a (k)th code sequence of the Golay code as a filter coefficient, the receive-focused signals corresponding to the transmit-focusing with respect to the (k)th group among the M number of groups until k=1–M.

10. An ultrasound imaging apparatus comprising:

(a) means for storing M number of Golay codes, wherein M is a positive number greater than two, the M number of Golay codes includes M number of code sequences, and the code sequences of the Golay codes are orthogonal to each other;

(b) a plurality of transducers for transmit-focusing ultrasound pulse signals to a transmitting focal point, wherein the transmit-focusing is sequentially performed by the M number of groups of the Golay code sequences converted into the ultrasound pulse signals and the transducers receive reflected signals from the transmitting focal points in response to the transmit-focusing with respect to each group;

(c) means for performing pulse compression with respect to the received signals, wherein the pulse compression is performed once with respect to each stored Golay code;

(d) means for receive-focusing the pulse-compressed signals; and (e) means for forming a B-mode image by processing the receive-focused signals.

11. The ultrasound imaging apparatus of claim 10, wherein the means for performing pulse compression further comprises:

means for repeatedly extracting the receiving signals corresponding to the transmit-focusing with respect to a (k)th group among the M number of groups from the received signals until k=1–M; and means for adding the extracted signals.

12. The ultrasound imaging apparatus of claim 11, wherein the means for repeatedly extracting further comprises:

means for repeatedly filtering, by using a (k)th code sequence of the Golay code as a filter coefficient, the receiving signals corresponding to the transmit-focusing with respect to the (k)th group among the M number of groups until k=1–M.

* * * * *

UNITED STATES PATENT AND TRADEMARK OFFICE
CERTIFICATE OF CORRECTION

PATENT NO.     : 6,638,227 B2
DATED          : October 28, 2003
INVENTOR(S)    : Moo Ho Bae It is certified that error appears in the above-identified patent and that said Letters Patent is hereby corrected as shown below:

<u>Column 7,</u>
Line 36, replace "envelope," with -- envelope --.

Signed and Sealed this

Thirtieth Day of March, 2004

JON W. DUDAS
*Acting Director of the United States Patent and Trademark Office*